(12) United States Patent
Kobayashi et al.

(10) Patent No.: US 8,079,913 B2
(45) Date of Patent: Dec. 20, 2011

(54) SLIDE-TYPE CONSTANT VELOCITY UNIVERSAL JOINT

(75) Inventors: Masazumi Kobayashi, Iwata (JP); Kisao Yamazaki, Iwata (JP)

(73) Assignee: NTN Corporation, Osaka (JP)

( * ) Notice: Subject to any disclaimer, the term of this patent is extended or adjusted under 35 U.S.C. 154(b) by 504 days.

(21) Appl. No.: 11/992,191

(22) PCT Filed: Sep. 19, 2006

(86) PCT No.: PCT/JP2006/318501
§ 371 (c)(1),
(2), (4) Date: Mar. 18, 2008

(87) PCT Pub. No.: WO2007/034776
PCT Pub. Date: Mar. 29, 2007

(65) Prior Publication Data
US 2009/0136287 A1    May 28, 2009

(30) Foreign Application Priority Data
Sep. 22, 2005  (JP) .................................. 2005-276498

(51) Int. Cl.
*F16D 3/227*  (2006.01)
(52) U.S. Cl. ........................................ 464/146; 464/906
(58) Field of Classification Search .................. 464/140, 464/146, 906
See application file for complete search history.

(56) References Cited

U.S. PATENT DOCUMENTS

| | | | |
|---|---|---|---|
| 4,020,650 A * | 5/1977 | Krude | 464/146 |
| 6,280,338 B1 * | 8/2001 | Hayama et al. | 464/146 |
| 6,299,542 B1 | 10/2001 | Ouchi et al. | |
| 6,383,082 B1 | 5/2002 | Déclas | |
| 6,478,683 B1 | 11/2002 | Ouchi et al. | |
| 6,616,538 B2 * | 9/2003 | Perrow | 464/146 |
| 6,913,540 B2 * | 7/2005 | Iihara et al. | 464/146 X |
| 7,090,583 B1 | 8/2006 | Dine | |
| 2001/0021671 A1 | 9/2001 | Ouchi et al. | |
| 2001/0024976 A1 | 9/2001 | Ouchi et al. | |
| 2002/0169025 A1 | 11/2002 | Kobayashi | |
| 2004/0097292 A1 | 5/2004 | Dine | |

(Continued)

FOREIGN PATENT DOCUMENTS

EP    0 950 824    10/1999

(Continued)

OTHER PUBLICATIONS

Universal Joint and Driveshaft Design Manual, AE-7, Society of Automotive Engineers, Inc., Warrendale, PA, pp. 10 and 167-170, TJ1079.S62.1979.*

(Continued)

*Primary Examiner* — Gregory Binda
(74) *Attorney, Agent, or Firm* — Wenderoth, Lind & Ponack, L.L.P.

(57) ABSTRACT

A light and compact slide-type constant velocity universal joint has a maximum operating angle of 30° or more through optimization of a ball contact angle relative to ball grooves, a ball contact ratio, and a cage offset amount. In the slide-type constant velocity universal joint, a ratio of ball diameter to outer ring outer diameter is 0.21 to 0.25, a ratio of ball pitch diameter to outer ring outer diameter is 0.64 to 0.68, a contact angle of the ball groove is 30° to 35°, a contact ratio of the ball groove is 1.02 to 1.08, and a ratio of cage offset amount to ball pitch diameter is 0.07 to 0.09.

2 Claims, 4 Drawing Sheets

U.S. PATENT DOCUMENTS

2005/0079918 A1 4/2005 Kobayashi et al.
2005/0148397 A1 7/2005 Nakagawa et al.

FOREIGN PATENT DOCUMENTS

| EP | 1 548 309 | 6/2005 |
| FR | 2 792 045 | 10/2000 |
| JP | 61-057233 | 3/1986 |
| JP | 61-57233 | 4/1986 |
| JP | 03-105725 | 5/1991 |
| JP | 3-105725 | 11/1991 |
| JP | 04-116018 | 4/1992 |
| JP | 4-116018 | 10/1992 |
| JP | 10-073129 | 3/1998 |
| JP | 2001-097063 | 4/2001 |
| JP | 2002-310180 | 10/2002 |
| JP | 2005-083408 | 3/2005 |
| JP | 2005-226778 | 8/2005 |

OTHER PUBLICATIONS

International Search Report mailed Dec. 26, 2006 for International Application No. PCT/JP2006/318501.
Supplementary European Search Report dated Aug. 11, 2009 in European Application No. 06810243.3.

* cited by examiner

SLIDE-TYPE CONSTANT VELOCITY UNIVERSAL JOINT

TECHNICAL FIELD

The present invention relates to a slide-type constant velocity universal joint used in automobiles and various industrial machineries. In particular, the present invention relates to a slide-type constant velocity universal joint that achieves both increased operating angle and weight and size reduction through optimization of a ball contact angle relative to ball grooves in inner and outer rings, a ball contact ratio, and a cage offset amount.

BACKGROUND ART

A constant velocity universal joint is classified into a fixed type which allows only angular displacement between two axes and a slide type which allows the angular displacement and axial direction displacement (plunging). Both types have a roller or a ball as a torque transmission component. The slide-type constant velocity universal joint for an automobile is used in a propeller shaft or a drive shaft. The drive shaft ordinarily includes the slide-type constant velocity universal joint on an inboard side and a fixed-type constant velocity universal joint on an outboard side. Because manufacturing costs are low for a "double-offset type constant velocity universal joint (DOJ-type)," which is a type of slide-type constant velocity universal joint having a ball as the torque transmission component, the DOJ-type is widely used as an inboard side joint of the drive shaft. The DOJ-type is also often used in a four-wheel drive vehicle that is capable of a high operating angle exceeding 25°.

There is a DOJ-type constant velocity universal joint that has six torque transmission balls and a DOJ-type constant velocity universal joint that has eight torque transmission balls. Between these, the DOJ-type constant velocity universal joint having six torque transmission balls is largely classified into two kinds; that of which a maximum operating angle is 25° or less and that exceeding 25°. When the maximum operating angle increases, a joint load capacity at the high angle is required to be increased as well. The joint load capacity is related to a ball groove depth and a cage thickness. Therefore, compared to the DOJ-type constant velocity universal joint of 25° or less, an outer ring outer diameter of the DOJ-type constant velocity universal joint having the maximum operating angle of 25° or more is normally about one size larger.

Conventionally, to increase the load capacity of the slide-type constant velocity universal joint, a slide-type constant velocity universal joint of which a shape of a contact ellipse between the ball groove and the ball is modified (refer to Patent Document 1), a slide-type constant velocity universal joint of which a track shape is modified by a combination of circular contact and angular contact (refer to Patent Document 2 and Patent Document 3), and a slide-type constant velocity universal joint of which offset amounts of an outer spherical surface center and an inner spherical surface center of a cage are modified (Patent Document 4) are proposed.

Patent Document 1: Japanese Utility Model Laid-Open Publication No. Showa 61-57233

Patent Document 2: Japanese Utility Model Laid-Open Publication No. Heisei 3-105725

Patent Document 3: Japanese Utility Model Laid-Open Publication No. Heisei 4-116018

Patent Document 4: Japanese Patent Laid-open Publication No. Heisei 10-73129

DISCLOSURE OF THE INVENTION

Problems to be Solved by the Invention

In recent years, in accompaniment to increased fuel efficiency of automobiles, a light and compact constant velocity universal joint is being demanded. Patent Document 4 is an invention related to size and weight reduction of the DOJ-type. The document secures a ball guiding force in a DOJ-type that has eight torque transmission balls and proposes optimal values of offset amounts of inner and outer spherical surface centers that makes a cage thickness a required minimum. However, with eight balls, the operating angle can only be a maximum of 25°.

At the same time, when the maximum operating angle exceeds 25° in a conventional six-ball slide-type constant velocity universal joint, weight significantly increases as a result of the outer ring outer diameter increasing by about one size, when compared to slide-type constant velocity universal joints of lesser operating angles. Therefore, in the slide-type constant velocity universal joint in which the shape of the contact ellipse between the ball groove and the ball is modified (Patent Document 1) and the slide-type constant velocity universal joint of which the track shape is modified by a combination of circular contact and angular contact (Patent Document 2 and Patent Document 3), it is difficult to achieve a high operating angle while achieving sufficient reduction in size and weight in the DOJ having six balls.

An object of the present invention is to allow a maximum operating angle of 30° or more and achieve size and weight reduction by controlling the outer ring outer diameter size in a DOJ having six balls.

Means for Solving the Problems

To solve the foregoing problem, an invention according to a first exemplary embodiment is a slide-type constant velocity universal joint including an outer ring in which six linear ball grooves are formed on a cylindrical inner circumferential surface in an axial direction, an inner ring on which six linear ball grooves are formed on a spherical outer circumferential surface in the axial direction and a connecting hole for connecting a shaft is formed in a center section, six torque transmission balls disposed on ball tracks formed by a pair composed of the a groove on the outer ring and a ball groove on the inner ring, and a cage having pockets for storing the torque transmission balls, a convex spherical outer circumferential surface that is in contact with and guided by the inner circumferential surface of the outer ring, and a concave spherical inner circumferential surface that is in contact with and guided by the outer circumferential surface of the inner ring and in which a spherical surface center of the outer circumferential surface and a spherical surface center of the inner circumferential surface are offset to opposite sides of a pocket center in the axial direction. In the slide-type constant velocity universal joint, a ratio of ball diameter to outer ring outer diameter is 0.21 to 0.25, a ratio of ball pitch diameter to outer ring outer diameter is 0.64 to 0.68, a contact angle of the ball groove is 30° to 35°, a contact ratio of the ball groove is 1.02 to 1.08, and a ratio of cage offset amount to ball pitch diameter is 0.07 to 0.09.

As a result of the contact angle of the ball being 30° to 35°, compared to a conventional ball with a contact angle of 35° to 40°, a depth of a contact ellipse of the ball at an operating angle of 0°, or in other words, a depth from a shoulder section of the ball groove to a longitudinal axis side edge section of the contact ellipse deepens. The operating angle can be increased by this amount. In addition, joint load capacity can be increases in a same manner as when the ball groove is deepened, without the depth of the ball groove being changed.

In the invention according to a second exemplary embodiment, a maximum operating angle is 30° or more.

The invention according to a third exemplary embodiment is a drive shaft including a fixed-constant velocity universal joint having eight torque transmission balls on an outboard side and including the slide-type constant velocity universal joint according to the previously mentioned configurations on an inboard side.

As a result of a configuration such as this, both reduction in weight and size and high operating angle of 30° or more can be achieved as a drive shaft assembly including the fixed-type and slide-type constant velocity universal joints.

Advantage of the Invention

The present invention can actualize a light and compact DOJ-type constant velocity universal joint that can have a maximum operating angle of 30° or more, while having the same strength and durability as a conventional DOJ-type constant velocity universal joint, as a result of interior specifications described in the claims being applied.

DETAILED DESCRIPTION OF THE INVENTION

Figure 1:
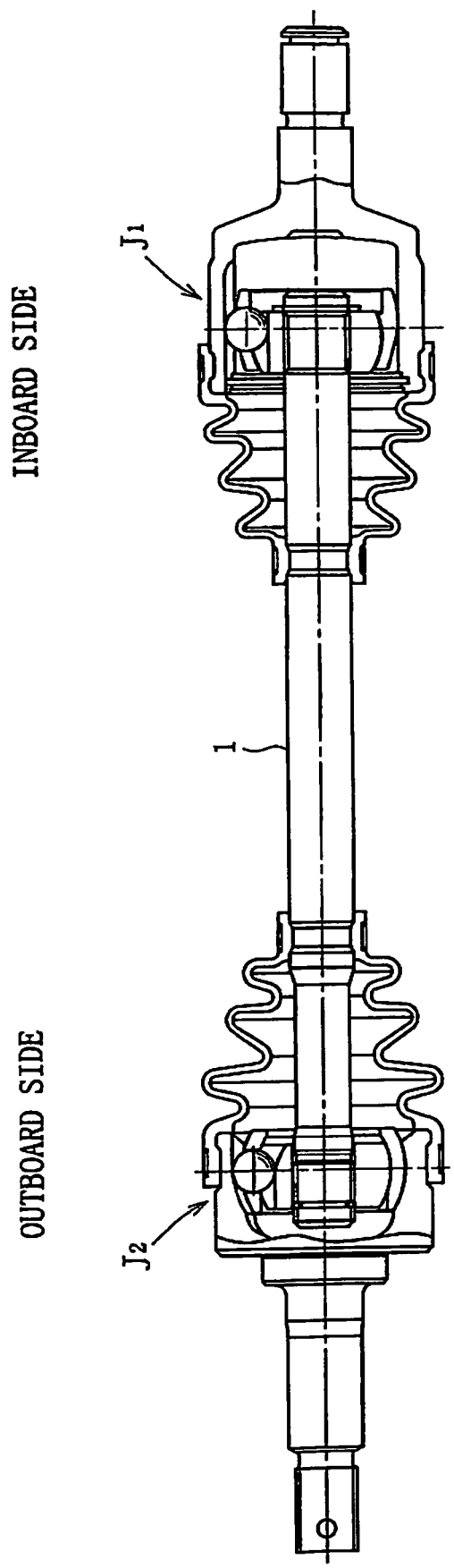
FIG. 1 is a longitudinal cross-sectional view of a drive shaft assembly.

An embodiment of the present invention will be hereinafter described with reference to the drawings. FIG. 1 shows a drive shaft assembly. The drive shaft assembly includes a constant velocity universal joint $J_1$ on an inboard side, a constant velocity universal joint $J_2$ on an outboard side, and an intermediate axis 1 connecting both joints $J_1$ and $J_2$. The constant velocity universal joint $J_1$ on the inboard side is connected to a differential gear. The constant velocity universal joint $J_2$ on the outboard side is connected to a wheel. The present invention is applied to the constant velocity universal joint $J_1$ on the inboard side.

Figure 2:
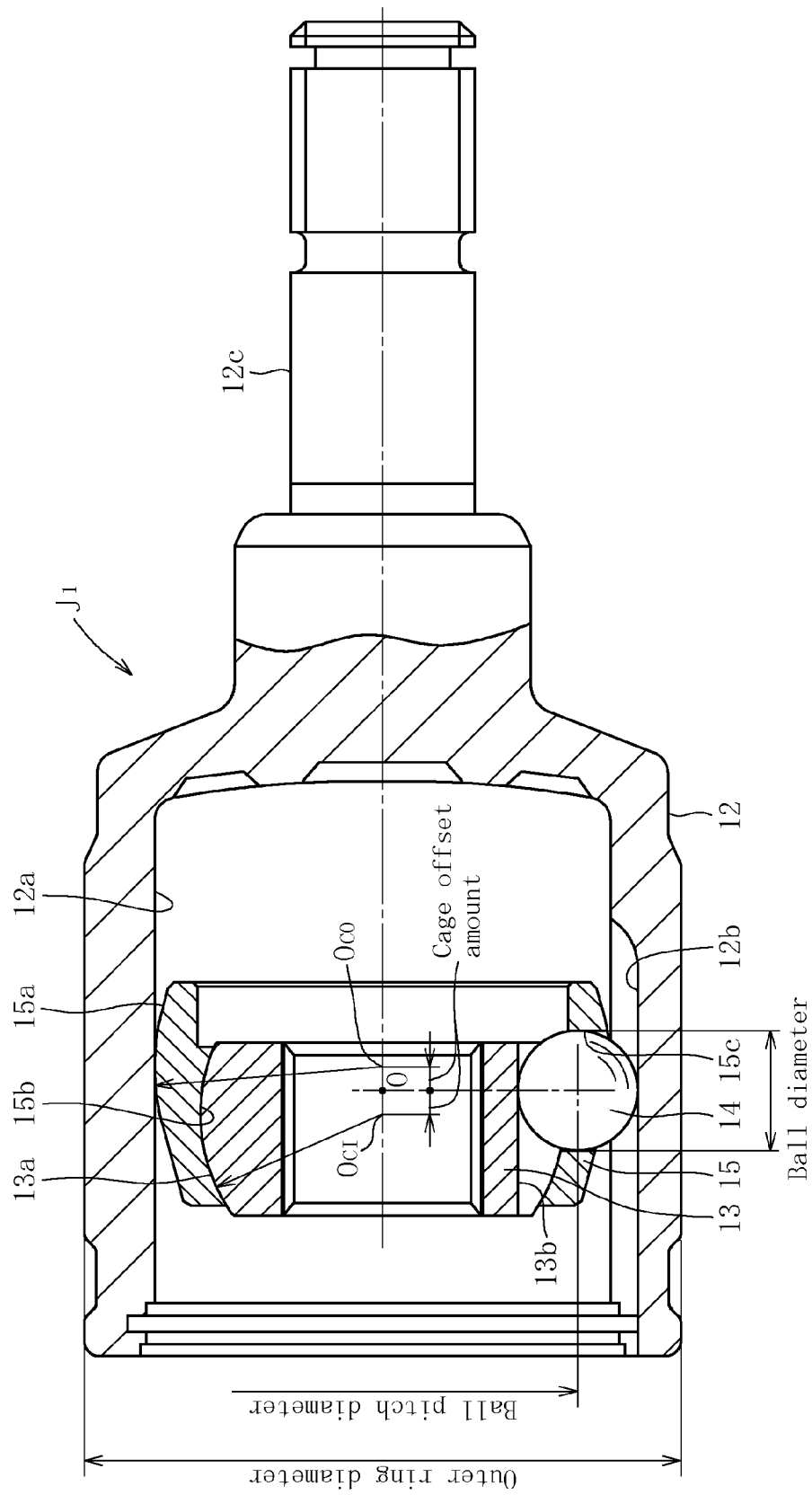
FIG. 2 is a longitudinal cross-sectional view of a DOJ in a drive axle in FIG. 1.

The constant velocity universal joint $J_1$ on the inboard side is made from a double-offset type constant velocity universal joint (DOJ). As shown in FIG. 2, the DOJ includes an outer ring 12, an inner ring 13, six torque transmission balls 14, and a cage 15. Six linear ball grooves 12b are formed in an axial direction on a cylindrical inner circumferential surface 12a of the outer ring 12. Six linear ball grooves 13b are formed in the axial direction on a spherical outer circumferential surface 13a of the inner ring 13. The torque transmission balls 14 are disposed on a ball track formed by a pair composed of the ball groove 12b of the outer ring 12 and the ball groove 13b of the inner ring 13. The cage 15 holds the torque transmission balls 14. A stem section 12c of the outer ring 12 is connected to a differential gear. The intermediate axis 1 is connected to a connecting hole in a center section of the inner ring 13 by serration or the like.

The cage 15 is a ring including an outer spherical surface 15a, an inner spherical surface 15b, and six pockets 15c. The outer spherical surface 15a is in contact with and guided by the inner circumferential surface 12a of the outer ring 12. The inner spherical surface 15b is in contact with and guided by the outer circumferential surface 13a of the inner ring 13. The pockets 15c house the torque transmission balls 14. A spherical center $O_{C0}$ of the outer spherical surface 15a and a spherical center $O_{C1}$ of the inner spherical surface 15b are each offset to opposite sides of a joint center O by an equal distance in the axial direction.

When the joint transmits torque while at an operating angle, the cage 15 rotates with the torque transmission balls 14 that move on the ball tracks in adherence to tilting of the inner ring 13 and holds the torque transmission balls 14 at an angle bisecting plane of the operating angle. As a result, constant velocity of the joint can be maintained. When the outer ring 12 and the inner ring 13 move in relative movement in the axial direction, sliding occurs between the outer spherical surface 15a of the cage 15 and the inner circumferential surface 12a of the outer ring 12, making possible a smooth axial movement (plunging).

Figure 3:
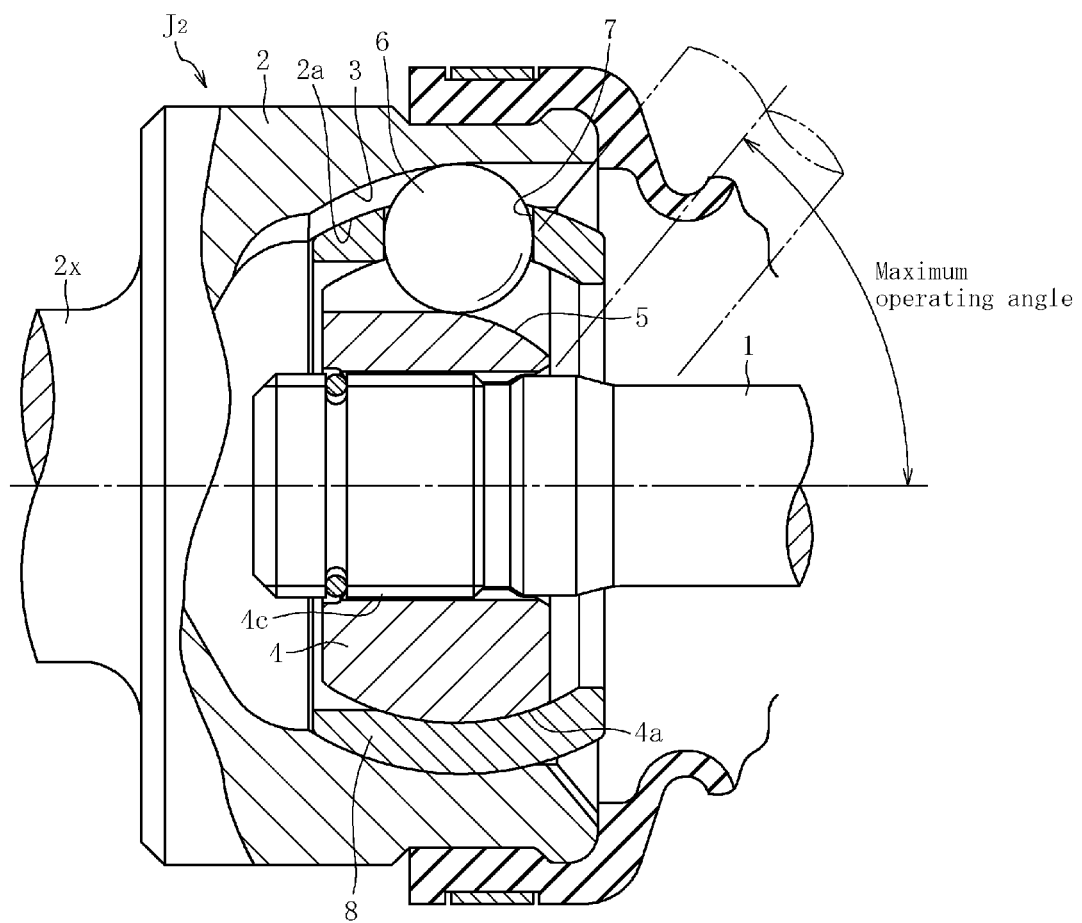
FIG. 3 is a longitudinal cross-sectional view of a UJ in the drive axle in FIG. 1.

The constant velocity universal joint $J_2$ on the outboard side is made from an undercut-free type constant velocity universal joint (UJ). FIG. 3 shows an example of a state in which an operating angle θ of the undercut-free type constant velocity universal joint is 0°. The constant velocity universal joint $J_2$ includes an outer ring 2, an inner ring 4, eight torque transmission balls 6, and a cage 8. Eight curved-bottom ball grooves 3 are formed on a spherical inner circumferential surface 2a of the outer ring 2. Eight curved-bottom ball grooves 5 are formed on a spherical outer circumferential surface 4a of the inner ring 4. The torque transmission balls 6 are each disposed on each ball track formed by the ball grooves 3 and 5 of the inner and outer rings. The cage 8 is interpositioned between the inner and outer rings, and respectively stores and holds each torque transmission ball 6 in eight pockets 7. The intermediate axis 1 (see FIG. 1) of the drive shaft is connected to an inner circumference of the inner ring 4 via a spline 4c. A wheel side component is connected to a system section 2x of the outer ring 2.

The ball grooves 12b and 13b of the DOJ-type constant velocity universal joint $J_i$ on the inboard side are a combination of two arcs. Therefore, the balls 14 make an angular contact with the ball grooves 12b and 13b of the inner and outer rings at two respective points C. In the present invention, to ensure load capacity at a high angle, a contact angle α of the balls 14 to both ball grooves 12b and 13b of the outer ring 12 and the inner ring 13 is 30° to 35°, as shown in FIG. 4.

The contact angle of a conventional ball groove is set within a range of 35° to 40°. Therefore, compared to a ball groove in which the contact angle is 30° to 35°, an operating angle until a longitudinal axis side edge section of a contact ellipse of the ball 14 reaches shoulder sections of the ball grooves 12b and 13b of the inner and outer rings is small. To actualize the maximum operating angle of 25° or more, conventionally, the depth of the ball grooves 12b and 13b and the cage 15 thickness were required to be significantly increased. In the present invention, as a result of the ball contact angle being a range of 30° to 35°, a high operating angle can be actualized without the depth of the ball grooves 12b and 13b and the cage 15 thickness being increased.

Figure 4:
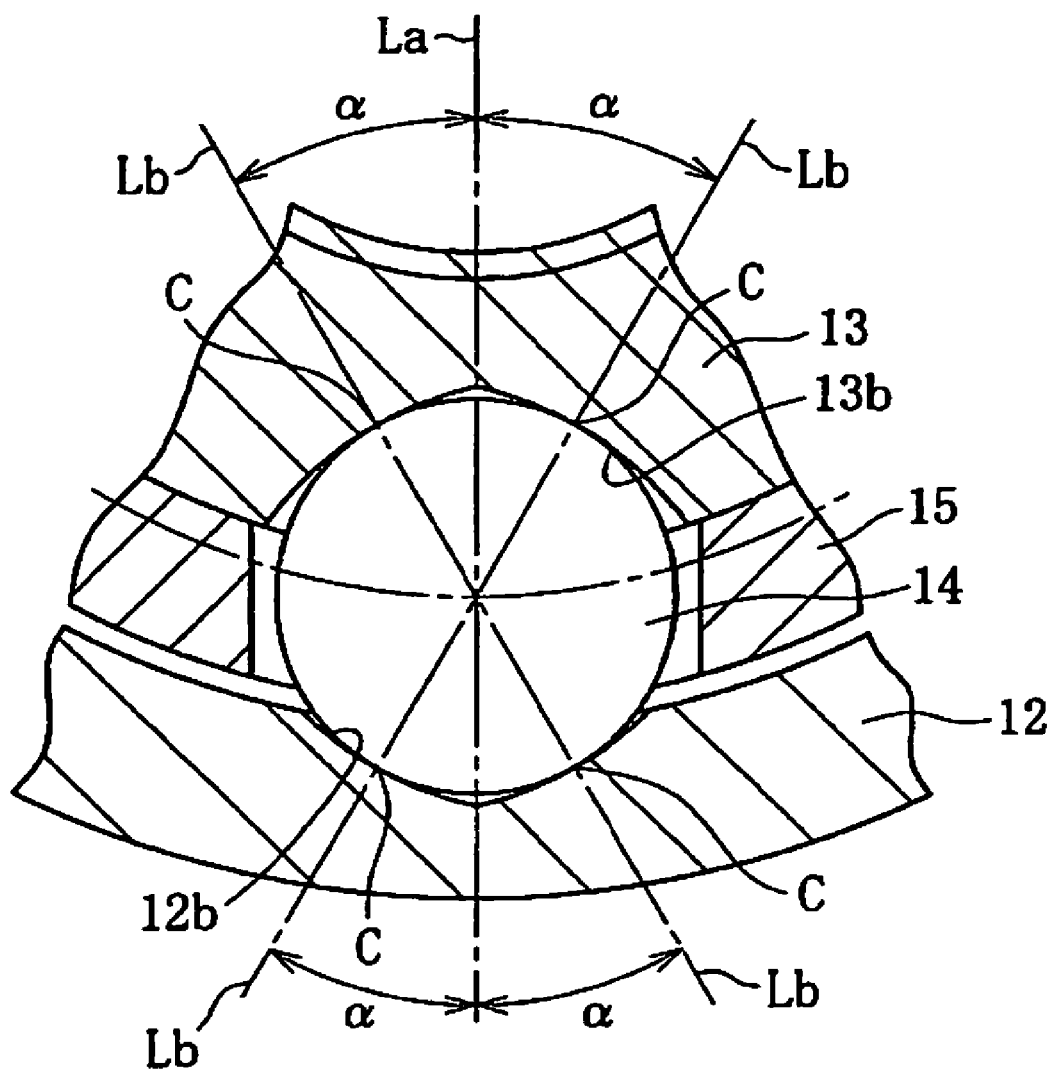
FIG. 4 is an enlarged cross-sectional view of a periphery of a torque transmission ball.

Here, "ball contact angle" refers to an angle α between a straight line La and a straight line Lb in FIG. 4. The straight line La is a center line in a circumferential direction of the ball grooves 12b and 13b at a cross section perpendicular to a curvature center line of the ball grooves 12b and 13b. The straight line Lb is a straight line connecting the contact point C of the balls on a ball groove side wall and a center of the balls 14.

EXAMPLE 1

The DOJ of the present invention does not merely have a contact angle of 30° to 35°. When the contact angle is simply 30° to 35°, an increase in ball groove surface pressure occurs and durability deteriorates. Therefore, in addition to the contact angle, interior specifications are modified. Table 1 compares a product of the present invention and an example of a conventional product on five items. In the product of the present invention, it is confirmed that a size reduction of 3% or more can be achieved in the DOJ with six balls compared to the conventional product.

TABLE 1

| | Item | Product of Present Invention | Conventional Product |
|---|---|---|---|
| 1 | (Ball diameter)/(Outer ring outer diameter) | 0.21~0.25 | 0.21~0.25 |
| 2 | (Ball pitch diameter)/(Outer ring outer diameter) | 0.64~0.68 | 0.64~0.68 |
| 3 | Ball groove contact angle | 30~35° | 35~40° |
| 4 | Ball groove contact ratio | 1.02~1.08 | 1.04~1.10 |
| 5 | (Cage offset amount)/(Ball pitch diameter) | 0.07~0.09 | 0.09~0.11 |

(Items 1 and 2 in Table 1)

Regarding Items 1 and 2 in Table 1, there is no difference between the product of the present invention and the conventional product. This is because, unless the ball diameter and the pitch diameter of the ball are reduced by a same ratio in accompaniment with the reduction of the outer ring outer diameter, the outer ring thickness becomes too thin and strength equal to that of the conventional product cannot be obtained.

(Items 3 and 4 in Table 1)

As is clear from Items 1 and 2, the ball diameter and the pitch diameter of the ball are reduced in the present invention, and reduction in the outer ring outer diameter is achieved. However, in this case, at the same contact angle and contact ratio as the conventional product, surface pressure increases or the contact ellipse pushes outside of the ball groove (pushing out against a ball groove shoulder section), causing a deterioration in durability. The increase in surface pressure causes deterioration of release life. The contact ellipse pushing out against the shoulder section causes chipping of a ball groove chamfer edge.

In other words, the ball groove surface pressure and the contact ellipse pushing out against the ball groove shoulder section have tendencies shown in Table 2, regarding four items. Based on Table 2, in the present invention, the ball groove contact angle and contact ratio are shifted within the ranges of Items 3 and 4 in Table 1 such that the same durability as the conventional product can be obtained. When the ranges of Items 3 and 4 in Table 1 are exceeded to the maximum side or the minimum side, in both cases, the same durability as the conventional product cannot be achieved.

TABLE 2

| Item | Guiding groove surface pressure | Pushing out of contact ellipse against guiding groove shoulder section |
|---|---|---|
| Reduction of ball diameter | Increase | Contact ellipse becomes smaller and pushing allowance increases |
| Reduction of ball pitch diameter | Increase | Contact ellipse becomes larger and pushing allowance decreases |
| Reduction of contact angle of ball groove | Increase | Contact ellipse becomes larger. However, distance to guiding groove shoulder section increases due to reduction of contact angle. Therefore, pushing allowance increases. |
| Increase in conact ratio of ball groove | Decrease | Contact ellipse becomes larger and pushing allowance increases |

(Item 5 of Table 1)

In the DOJ-type constant velocity universal joint, the outer ring ball groove and the inner ring ball groove are formed to be mutually parallel in the axial direction. When the DOJ is at the operating angle, the balls are held at the bisecting plane of the operating angle by cage offset, and constant velocity is maintained. The offset amount of the cage has an optimal value. Excessive reduction of the cage offset amount leads to a reduction in operability. When the operating angle is granted, a guiding force of the cage guiding the ball within the angle bisecting plane of the operating angle decreases. Operability of the DOJ deteriorates, and constant velocity becomes unstable.

At the same time, excessive increase of the offset amount leads to an increase in outer ring outer diameter. This is because, when the cage offset amount increases, when the operating angle is granted, a relative movement amount of the ball to a cage window in the radial direction during a single rotation of the joint increases. Therefore, even at the maximum operating angle, the thickness of the cage is too thick to prevent the ball from leaving the cage pocket. As a result, the outer ring outer diameter increases.

From the above, the cage offset amount is preferable reduced to minimize the outer ring outer diameter. However, when the cage offset amount is too small, a reduction in operability occurs. Therefore, the product of the present invention is set to the range in Item 5 of Table 1. An optimal range of the cage offset amount changes depending on joint size. Therefore, the optimal range is indicated by a ratio with the ball pitch diameter to eliminate changes among sizes.

Joint interior specifications are described for achieving a 3% or more size reduction in the six-ball DOJ, compared to the conventional DOJ. However, as a result of all Items 1 to 5 being applied as a set, a DOJ having the same strength and durability as the conventional product can be established.

The present invention can have a high operating angle of 30° or more and can achieve reduction in weight and size by a drive shift assembly in which the fixed-constant velocity universal joint having eight balls is disposed on the outboard side and the slide-type constant velocity universal joint of the present invention is disposed on the inboard side.

The invention claimed is:
1. A slide-type constant velocity universal joint for use on an inboard side of a drive shaft of an automobile, the slide-type constant velocity universal joint comprising:
an outer ring in which six linear ball grooves are formed on a cylindrical inner circumferential surface in an axial direction;

an inner ring on which six linear ball grooves are formed on a spherical outer circumferential surface in the axial direction and a connecting hole for connecting a shaft is formed in a center section;

six torque transmission balls disposed on ball tracks, each of the ball tracks being formed by one of the ball grooves on the outer ring and one of the ball grooves on the inner ring; and a cage having pockets accommodating the torque transmission balls, wherein the cage has a convex spherical outer circumferential surface that is in contact with and guided by the inner circumferential surface of the outer ring, and a concave spherical inner circumferential surface that is in contact with and guided by the outer circumferential surface of the inner ring, wherein a spherical surface center of the outer circumferential surface and a spherical surface center of the inner circumferential surface are respectively offset to opposite sides of a joint center in the axial direction by an equal distance, the distance constituting a cage offset amount, wherein a ratio of ball diameter to outer ring outer diameter is 0.21 to 0.25, wherein a ratio of ball pitch diameter to outer ring outer diameter is 0.64 to 0.68, wherein a contact angle of the ball grooves is 30° to 35°, wherein a contact ratio of the ball grooves is 1.02 to 1.08, the contact ratio being a ratio of groove radius of curvature to ball radius, wherein a ratio of the cage offset amount to ball pitch diameter is 0.07 to 0.09, and wherein a maximum operating angle of the slide-type constant velocity universal joint is at least 30°.

2. A drive shaft comprising the slide-type constant velocity universal joint according to claim 1 on an inboard side of the drive shaft, and further comprising a fixed-constant velocity universal joint having eight torque transmission balls on an outboard side of the drive shaft.

\* \* \* \* \*